Jan. 10, 1950 E. F. ANDREWS 2,493,741

STOP-ON-SIGNAL RADIO APPARATUS

Filed Nov. 1, 1946 3 Sheets-Sheet 1

Inventor:
Edward F. Andrews
By Hinkle, Horton, Ahlberg, Hausmann & Wupper
Attorneys Jan. 10, 1950 E. F. ANDREWS 2,493,741

STOP-ON-SIGNAL RADIO APPARATUS

Filed Nov. 1, 1946 3 Sheets-Sheet 2

Inventor:
Edward F. Andrews
By Hinkle, Horton, Ahlberg, Hausmann & Wupper
Attorneys.

Jan. 10, 1950 E. F. ANDREWS 2,493,741

STOP-ON-SIGNAL RADIO APPARATUS

Filed Nov. 1, 1946 3 Sheets-Sheet 3

Inventor:
Edward F. Andrews
By Hinkle, Horton, Ahlberg, Hausmann & Wupper
Attorneys.

Patented Jan. 10, 1950

2,493,741

UNITED STATES PATENT OFFICE 2,493,741

STOP-ON-SIGNAL RADIO APPARATUS

Edward F. Andrews, Chicago, Ill.

Application November 1, 1946, Serial No. 707,220

26 Claims. (Cl. 250—40)

This invention relates to radio apparatus of the self-tuning type. More particularly, it relates to "stop-on-signal" apparatus, especially receivers, requiring no manual presetting to tune in progressively the signals or stations coming within their range of sensitivity. Such receivers, although having broad utility, are particularly advantageous for use as automobile receivers because the frequent changes in geographical position of the vehicle cause different stations to be within range for reception at different times. This feature of stop-on-signal receivers makes them also especially applicable to all types of automotive vehicles, including watercraft and aircraft.

Receivers of this type have been known in the art also as "stop-on-carrier" or "signal-seeking" receivers. Although "stop-on-carrier" is substantially the same in meaning as "stop-on-signal," I now prefer the use of the term "stop-on-signal" receiver for this class of device. Receivers of this general type have been described and claimed in previous patents and patent applications, such as those of Edward F. Andrews, Patent No. 2,326,738, issued August 17, 1943, and Patent No. 2,262,218, issued November 11, 1941; also in the pending applications of William J. O'Brien, Serial No. 605,397, filed July 16, 1945, and Serial No. 387,908, filed April 10, 1941, which on June 1, 1948, matured into Patent No. 2,442,430.

Certain features of the apparatus disclosed in this application are disclosed and claimed in the foregoing applications and also in my contemporaneously filed application, Serial No. 707,219 and the contemporaneously filed application of Olgierd Gierwiatowski, Serial No. 707,132.

Although the invention to be described is especially adapted for use with stop-on-signal receivers for broadcast reception, its use is not necessarily restricted to this field, for stop-on-signal apparatus may also find application in radio transmitters, in the field of electronic control, and in other resonance responsive electronic apparatus.

One of the objects of the present invention, therefore, is to provide a new and improved stop-on-carrier, signal-seeking, or stop-on-signal radio apparatus.

Another object of my invention is to provide an improved stop-on-signal radio receiver.

A further object of the present invention is to provide a new and improved stop-on-signal radio apparatus of the type including variable tuning means for tuning in different signals, power storage means for varying the tuning means, and means for terminating the variation of the tuning means by the power storage means in response to a signal. The power storage means is preferably a resilient one, such as a spring, but may be of other types, of which a gravity actuated weight may be cited as an example.

A further object of the present invention is to provide a new and improved stop-on-signal apparatus of the character set forth in the preceding paragraph including also, resiliently applied stopping means to stop the movement of the tuning means in response to a signal.

A further object of the present invention is to provide a new and improved stop-on-signal radio apparatus including variable tuning means, power storage means for varying the tuning means, resiliently applied brake means controlling the tuning means, and electromagnetic means energizable to provide magnetic flux of opposed polarities for controlling the brake means to initiate and to terminate variation of the tuning means.

A still further object of the present invention is to provide a new and improved stop-on-signal radio apparatus including variable tuning means for tuning in different signals, and power storage means for varying said tuning means characterized further in that means are provided to restrain the variation of the tuning means by said power storage means without appreciably increasing the force required for starting, thereby to regulate the speed while retaining reliable starting. The restraining means is particularly important because the power storage means constitutes what may be termed a power means tending to discharge itself too rapidly and to accelerate the tuning means beyond the desired speed for the most accurate and convenient stop-on-signal tuning.

Another object of the invention is to provide a new and improved stop-on-signal radio apparatus including variable tuning means for tuning in different signals, power storage means for varying said tuning means, and movement restraining means driven at high speed by step-up transmission means for regulating the speed of the tuning means.

A further object of the present invention is to provide a new and improved stop-on-signal radio apparatus including power storage means for varying the tuning means and means associated with the tuning means for terminating the variation of the tuning means in response to a signal, which means includes a brake with a movable member, the surface of which moves through a greater distance in unit time or at a higher speed than the tuning means, and a controlled member operating upon the high speed member.

Another object of the present invention is to provide a new and improved stop-on-signal apparatus including power storage means for varying the tuning means and wherein the means for terminating variation of said tuning means in response to a signal includes brake means operable upon an element associated with the tuning means and movable through a greater distance or at a higher speed than the tuning means and wherein high speed movement restraining or speed regulating means are also associated with the tuning means.

Another object of the present invention is to provide a new and improved stop-on-signal radio apparatus characterized in that movement restraining means are provided to control the speed of movement of the tuning means in the tuning direction and that the movement restraining means is arranged so as to provide a much smaller restraint to movement in the direction opposite to the tuning direction so that rapid movement in the nontuning direction is permitted to recharge the power storage means quickly.

A further object of the present invention is to provide a new and improved stop-on-signal radio apparatus including power storage means for varying the tuning means in a predetermined direction for tuning in different signals and means, preferably electromagnetic, are provided for recharging the power storage means.

More particularly, it is an object to provide an apparatus of the foregoing character wherein the power storage means moves the tuning means in the direction in which stop-on-signal tuning is effected and the electromagnetic means moves the tuning means more rapidly in the opposite direction and at the same time stores power in the power storage means.

A further object of the present invention is to provide a new and improved stop-on-signal radio apparatus characterized in that power storage means are provided for varying the tuning means in the tuning direction and that power is stored in said power storage means by electromagnetic means energized under the control of limit switch means operable by the power storage means.

A further object of the present invention is to provide a novel stop-on-signal radio apparatus including tuning means variable by a spring wherein the spring is charged by electromagnetic means and more particularly wherein the electromagnetically moved means and tuning means move at a relatively slow speed whereas the tuning means is stopped in response to the reception of a signal by brake means operating upon an element moved at high speed by the spring means and operatively connected to the tuning means and electromagnetic means.

Another object of the present invention is to provide new and improved stop-on-signal radio apparatus including movable tuning means, power storage means for driving the tuning means, power storage means for stopping said tuning means, electromagnetic means individual to said driving and stopping power storage means energizable from an electrical power source for storing power in the respective power storage means, and means, preferably also energizable from said power source, operable in response to the tuning in of a signal for releasing said stopping power storage means.

A further object of the present invention is to provide a new and improved stop-on-signal radio apparatus including resilient power storage means and restraining means exerting little restraint at rest and having a restraint at high speed which is large by comparison to the friction of the system for controlling the movement of the tuning means to provide the best speed for stop-on-signal tuning.

Other objects and advantages of the present invention will become apparent from the ensuing description in the course of which reference is had to the accompanying drawings, in which.

Figure 1:
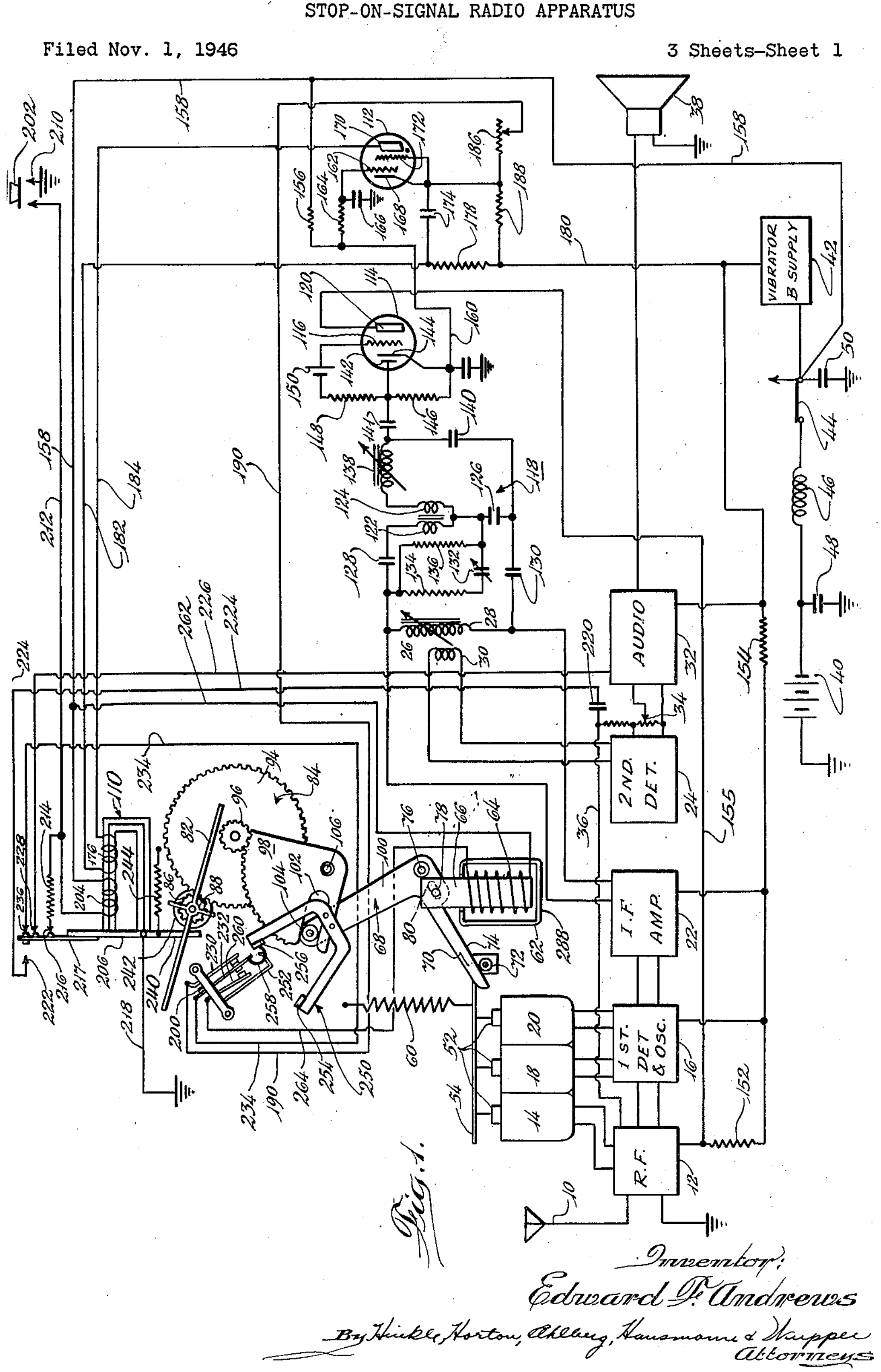
Fig. 1 is a schematic representation of a preferred embodiment of the invention as applied to an automobile receiver.

Referring now to the drawings and more particularly to Fig. 1, it may be noted that this figure illustrates schematically an embodiment of the invention applied to an automobile radio receiver. More particularly, it represents an automobile radio receiver of the superheterodyne type including an antenna 10; a tuned radio frequency amplifier 12 and its associated variable tuning means 14; a first detector and oscillator 16 and the variable tuning means 18 and 20 associated therewith; an intermediate frequency amplifier 22 which may have a plurality of stages; a second detector 24; a transformer 26 having a primary winding 28 and a secondary winding 30 coupling the intermediate frequency amplifier to the second detector; an audio frequency amplifier 32; a volume control voltage divider 34; an automatic volume control circuit 36 and a loud speaker 38. The particular construction of the foregoing elements has not been disclosed in detail in the drawing nor will it be described in detail because it may be of any well known construction.

Power is supplied to the apparatus by the vehicle storage battery 40, the positive terminal of which is grounded, and which serves directly as a source of filament supply for the various tubes as well as to energize a relay and a solenoid forming part of the stop-on-signal means to be described hereinafter. The power supply includes a high voltage "B" supply unit 42, which may be a standard vibrator unit of the type commonly used in vehicular radios. The supply of power to the radio apparatus, i. e., to both the filaments and to the vibrator, is controlled by an on-and-off switch 44 which may be physically connected to the volume control 34. High frequency currents are isolated from the battery circuit by the choke coil 46 connected between the switch and the negative terminal of the battery and the capacitors 48 and 50 connected in effect from the opposite terminals of the choke coil to ground.

The variable tuning means 14, 18, and 20, associated with the receiver, may be of various type, such as of the capacitor or permeability type, and they are illustrated in the drawing as being of the variable permeability type having powdered iron cores 52 movable axially within the interior of associated coils in known manner. It is preferred that the cores be mounted for simultaneous movement as upon a yoke 54 and the movement of which is effected and controlled in a manner now about to be described. In accordance with one of the features of the present invention, the tuning means are varied in a predetermined direction for tuning in different signals by power storage means varying the tuning means in said predetermined direction, and further, means are provided for terminating the variation of the tuning means in said predetermined direction in response to a signal occurring when the various radio circuits have been tuned to respond strongly to an incoming signal. The power storage means is preferably of the resilient, as distinguished from other types, such as gravity, and is shown as a spring 60 having one end operatively connected, as by direct attachment, to the yoke 54 and the other to a suitable stationary point such as a chassis to be referred to and described later. However, it should be understood that gravity or other types of power storage means can be used. In the illustrated embodiment, the spring is arranged as disclosed and claimed in the copending application of Olgierd Gierwiatowski, to move the yoke upwardly as viewed in Fig. 1, i. e., from a position wherein the cores are inside their associated coils to a position wherein the cores are retracted from the coils, i. e., from the low frequency end of the band of frequencies for which the receiver is designed to the high frequency end. However, the cores may be moved in the opposite direction during the tuning operation, as also disclosed and claimed in said Gierwiatowski application.

The power storage means is recharged when the tuning means has reached a limit, in this case the high frequency end, of movement by suitable power means, preferably electromagnetic means, such as a solenoid indicated as a whole by reference character 62 and including a winding 64 which is adapted to be energized under certain conditions as will be described more fully hereinafter.

The solenoid is operatively connected to the tuning means and more specifically to the yoke 54 in such manner that when energized the solenoid plunger 66 effects movement of the cores to their low frequency limit and simultaneously charges the spring 6. The plunger is operatively connected to the yoke through a pivotally mounted lever indicated as a whole by reference character 68 and having an arm 70 having camming relation with a roller 72 mounted for movement with the yoke. The roller is more specifically engaged by a roller engaging surface 74 of the arm 70. The lever 68 is pivotally mounted for movement about a pivot 76 about which it is moved in a counterclockwise direction by the solenoid plunger when the solenoid is energized. The plunger is connected to the lever through a pin and slot connection including the pin 78 extending through the bifurcated upper end of the plunger and a slot 80 in the lever.

The solenoid is deenergized by the limit switch when the cores have been moved to their initial position and the spring 60 has been tensioned. Thereafter the spring moves the tuning means in tuning direction until the tuning means are stopped, i. e., further variation of the tuning means is prevented by the stop-on-signal means.

The movement of the tuning means in tuning direction is restrained or controlled so that it will not move with an excessive speed in so far as the operation of the stop-on-signal means is concerned. If the power storage means were permitted to act without any restraint, it would move the cores at an excessive speed, and in the case of a spring, it would simply jerk the cores from their associated coils and it is very doubtful if accurate stopping could be effected, at least with any degree of reliability. Therefore, in accordance with one of the important features of the present invention, the variation of the tuning means, i. e., the speed of movement of the cores 52, is controlled by a movement restraining means which, in accordance with another feature of the invention, exerts little restraint when the tuning means is at rest and exerts a restraint at high speeds which is large by comparison to the friction of the system. In the preferred embodiment of the invention, the movement restraining means takes the form of a light wind vane 82 which is shown connected to the tuning means and solenoid plunger through transmission including a variable mechanical advantage transmission and of a character disclosed and claimed in the copending application of Olgiered Gierwiatowski. However, it should be understood that this particular type of transmission need not be used as the solenoid and tuning means could be connected to the wind vane through a simple nonvariable gear transmission.

The spring 60 constituting, as it does, a resilient power storage means is the type of power storage means tending to release its power with a quick snap, that is, with a constant and rapid acceleration, unless properly restrained. A very effective restraining means is provided in the form of the wind vane 82, which is connected to the spring through a gear train which insures that the vane is turned a considerable number of revolutions while the spring is contracted from its charged or stretched position to its discharged or contracted position. Thus the necessary restraint can be provided to cause the spring and the tuner, to which it is directly connected, to move from one end of the range to the other at a relatively slow and relatively uniform speed which is determined by the pull of the spring, the aerodynamic resistance of the wind vane, and the step-up ratio of the gear train connecting the two. If the gear ratio is increased, the tuner will move more slowly because the torque applied to the wind vane is the pull of the spring divided by the gear ratio. Conversely, a lower gear ratio will cause the wind vane and the tuner to move faster, as with the lower gear ratio a greater torque is applied to the wind vane.

It is desirable that the tuning speed be restrained by the aerodynamic resistance of the wind vane, and to the smallest extent by friction. This may be facilitated by the use of a large wind vane revolving at slow angular velocity, which are characteristics of the wind vane 82. A slower speed gear train has less friction than a higher speed gear train and the larger fan although revolving at slower angular velocity provides the required restraining effect. The low friction provides easy starting and, therefore, requires less spring tension. This enables the spring to be recharged with a smaller current flow through the recharged solenoid.

The wind vane, which is preferably of relatively light construction, may have its mass increased as by loading the tips of the blades so as to increase its inertia. It will then accelerate more slowly initially and minimize skipping closely adjacent stations. With a good one way drive or ratchet driving the vane, this can be done without the resulting added momentum causing more overrun because the ratchet permits the brake drum (to be described hereinafter) to stop while the wind vane is still turning. If no ratchet is used the wind vane should be made as light as possible. Although a closely adjacent signal will be tuned in more slowly with the modified construction, the normal tuning speed, determined by the wind vane dimensions, is soon attained and the entire tuning range can be covered within almost the same time as with an unloaded vane.

The physical construction of the transmission and its correlation to the solenoid, tuning means and restraining means is fully illustrated in Figs. 2 and 3, and will be described in greater detail hereinafter. However, in order that a better understanding may be had of the invention claimed herein, the transmission will be described briefly, mainly in conjunction with the diagrammatic disclosure of Fig. 1.

The transmission is indicated as a whole by reference character 84. The wind vane is driven by a high speed gear 86 preferably, but not necessarily, through a one-way driving connection 88 illustrated in greater detail in Fig. 6 and comprising a spring 90 driven by the gear 86 and adapted to drive the wind vane shaft 92 through the intermediary of a friction sleeve 93 engageable by the spring and fixedly secured to the shaft 92. The high speed gear is loosely mounted upon the shaft 92 but drives the latter when rotated in a direction to wind the spring 90 around the sleeve, which it does during operation in the tuning direction. When operated in the opposite direction as in recharging, the spring unwinds and releases the gear from the shaft so that the wind vane exercises less restraint when the spring is being recharged than it does when the spring moves the tuning means. The gear is also released from the vane 82 when the gear is stopped by a brake (to be described hereinafter) when the vane is rotating, thereby permitting the vane to came to rest slowly after the gear is stopped.

The high speed gear 86 is driven by a spur gear 94 which, in turn, is driven by a pinion 96.

The transmission includes a variable mechanical advantage driving means comprising a sector gear 98, the lever 68, and a slot and roller connection including a slot 102 on the sector gear and a roller 104 mounted at the end of arm 100 of lever 68. The sector gear drives pinion 96 and moves about an axis defined by its supporting pin 106, and the arrangement between its axis and the axis of the lever 68 and between the pin and slot, is such that the wind vane is driven with a variable gear ratio and torque to provide a band spread compensation, as more fully disclosed and claimed in the copending Gierwiatowski application. In so far as the present invention is concerned, it need be stated only that the gear ratio is lowest and the torque applied to the wind vane highest when the tuning means is to be driven at the highest speed, i. e., at the low frequency end where the spread, in cycles per unit of movement, between the stations or signals is the greatest. At the other extreme of movement of the tuning means where the band spread is narrowest, i. e., at the high frequency end, the gear ratio is highest and the torque transmitted to the wind vane is lowest and the speed of the tuning means is lowest.

The stop-on-signal means includes a relay 110, hereinafter called the stop-on-signal relay, which is of a type adapted magnetically to be latched, i. e., flux-latched, in its operated position and which is adapted to be released and returned to its nonoperated position when a signal is tuned in. The relay is supplied with a pulse of current to release it, preferably by electronic means including an electron tube 112, which may be but is not necessarily of the gas type, a control or mixer tube 114 controlling the conductivity of tube 112 and which is supplied with opposing actuating and restraining control voltages from the radio receiver. A negative restraining voltage is supplied to the grid 116 of the tube through means including what is preferably called a balanced bridge transformer or network indicated as a whole by reference character 118, and the positive actuating voltage is supplied to the plate 120 from the plate voltage supply for a tube in the radio frequency section of the receiver. The balanced bridge network or circuit is supplied with a signal from the intermediate frequency transformer 26 and it supplies a restraining voltage which prevents ionization of the gas tube 112, except exactly at or close to the intermediate frequency, thus providing the sharp precise response desired for exact tuning. The specific form of the circuit is similar in many respects to the one disclosed and claimed in the application of William J. O'Brien, Serial No. 387,907, filed April 10, 1941, now Patent No. 2,426,580. It comprises a primary circuit and a secondary circuit which are inductively coupled by the mutual inductance of the coupled coils 122 and 124 and are capacity coupled by the capacitor 126. The primary circuit includes the adjustable primary inductance of the primary winding 28 of transformer 26, the capacitors 128 and 130, and a resistance phasing or neutralizing arrangement consisting of the adjusting capacitor 132 and the resistors 134 and 136. The secondary circuit includes an adjustable inductance 138 and capacitor 140. The inductances 28, 30, 138, and 122, 124, and the capacitors 140, 130, 126, 128, and 132, and the resistors 134 and 136, are included within a shielded metal container and form part of what is preferably referred to as a balanced bridge transformer.

The circuit constants of the primary and secondary circuits are arranged so that they resonate at or near the intermediate frequency. The mutual inductive reactance of coils 122 and 124 is also adjusted to equal the capacitative reactance of capacitor 126 at the intermediate frequency. The phasing network comprising the capacitor 132 and resistors 134 and 136, serves to balance out the resistive coupling which exists between the primary and secondary circuits so that the total coupling between these two circuits may approach zero at the intermediate frequency. The arrangement is one providing a response curve with two negative voltage peaks, one on either side of the resonant center and a very steep depression therebetween at the resonance center going down to or nearly to zero voltage. The resonance of the secondary circuit effected by the capacitor 140 tuned by variable inductance 138 causes these two peaks to be higher in voltage.

Incidentally, the inductance 138 may be of the adjustable iron core type.

The restraining voltage derived from the balanced bridge circuit is coupled through capacitor 141 to the diode plate 142 of the rectifier section of tube 114 which may be a diode-triode tube, such as the 6SQ7G or 6Q7. The plate is connected to the cathode 144 of the tube through a resistor 146 across which the rectified negative restraining voltage appears. This voltage is supplied to the grid 116 of the tube through a resistor 148 and a single cell biasing battery 150. The biasing battery 150 maintains a sufficient negative bias upon the grid 116 to keep the main plate current sufficiently low when there is no signal upon the grid 47.

A relatively broader positive actuating voltage is applied to the plate 49 of the tube 114. This voltage may be called a reverse AVC voltage as it is obtained from the plate of a tube in the radio frequency section to the grid of which an automatic volume control voltage is supplied through conductor 36. Variations in this plate current creates a variable voltage drop across the resistor 152 in the plate circuit of the tube. A signal at resonance will produce a large increase in voltage across the voltage divider 34 and a correspondingly larger negative voltage upon the automatic volume control lead 36. This reduces the plate current of the radio frequency amplifier tube and decreases the voltage drop across resistor 152 which is connected to the "B" supply through resistor 154. As a result, the plate end of the resistor is at a higher positive potential and this increased potential is placed upon the plate 120 of tube 114 through conductor 155.

The plate current of tube 114 is thus controlled jointly by the negative restraining voltage applied to the grid 116 and the positive actuating voltage applied to the plate 120. The actuating voltage, while having a broader response than the negative, is prevented from increasing the plate current until near resonance because of the relatively higher double-peaked negative restraining voltage. However, as resonance is approached, the negative restraining voltage drops very suddenly, whereupon voltage drop across resistor 156 increases. This resistor is in the plate-cathode circuit of tube 114 as it is connected to the negative side of the battery through the conductor 158 and to the cathode by conductor 160. The increase in voltage drop across the resistor 156 makes the cathode end of that resistor more positive and the increase in voltage is utilized to render conductive the tube 112. The grid 162 of this tube is connected to the cathode end of resistor 156 through a small time delay network consisting of resistor 164 and capacitor 166. This delay network prevents extremely short pulses or other disturbances from prematurely ionizing the gas tube.

The connection of resistor 156 to the negative side of the battery enables the cathode 144 of tube 114 to be at about zero voltage when normal plate current is flowing in tube 114, i. e., when there is no signal present.

The gas tube includes also a cathode 168 and a plate 170 and a shield grid 172.

When the gas tube is rendered conductive in response to the tuning in of a signal, it is utilized to produce a current pulse. To effect termination of the variation of the tuning means, an enhanced current pulse is preferably provided by a normally charged capacitor 174 which is adapted, when the tube is rendered conductive, to discharge through the tube and through a bucking winding 176 of the relay which, when energized by the pulse of current, produces a flux adapted to oppose or to buck the flux magnetically latching the relay in its operation position, as will be described in greater detail shortly.

The capacitor 174 is preferably charged with a slight time delay so that when the tuning operation is initiated the tuning means is moved a sufficient distance so that it will not be stopped in response to the same signal. The time delay in charging is provided by a resistor 178 connected between the capacitor and the "B" supply by a conductor 180. The capacitor is connected to the cathode and to a conductor 182 connecting the resistor 178 to one terminal of the winding 176. The other terminal of the winding 176 is connected directly to the plate 170 of the gas tube by the conductor 184.

The sensitivity of the apparatus is controlled by an adjustable resistor 186 located in the cathode to ground circuit of tube 112 and through which there normally flows a small current as determined by a bleeder resistor 188, connecting it to the "B" supply of conductor 180. The connection of resistor 186 to ground includes a conductor 190 leading to the limit switch 200.

The limit switch is a single pole, double throw switch of the over-center type and it is adapted selectively to energize the recharging solenoid 62 and to render inoperative the stop-on-signal means whenever the solenoid is energized. The arrangement is also such that the stop-on-signal relay must be in its operated position before the solenoid can be energized or for the stop-on-signal means to be operated.

The stop-on-signal tuning means is started preferably by a manually operable switch 202 which is normally open. When the switch is closed it energizes a relay operating winding 204 which produces a flux opposite to that produced by the bucking winding 176. When winding 204 is energized, the relay armature 206 is moved to form a closed magnetic path including the armature and the relay yoke 208. When the armature is thus actuated to close the magnetic path, the relay is in what is termed its "operated position" and it is held in this position upon the release of the push button switch by the residual magnetism of the magnetic circuit and preferably also by a small current flow through the coil 204 which aids the residual flux.

The energizing circuit for operating winding 204 includes the ground conductor 210, conductor 212 connecting the switch to the winding, and the conductor 158 which leads to the negative ungrounded side of the battery. Thus, as the switch is closed, the winding 204 is connected directly across the battery.

The additional magnetic latching of the relay is provided by what may be termed a bleeder current through the winding 204. When the switch is opened the circuit to ground is completed through a bleeder resistor 214, contact 216, contact 217 at one end of the relay armature 206, and a ground connection 218 from the armature.

When the stop-on-signal relay is in its operated position the automatic gain control of the receiver is modified from a normal slow AVC necessary for good audio reception to a fast acting AVC. A fast acting automatic volume control is desirable during tuning because it prevents reduction of sensitivity, as a result of the fact that the previously referred to actuating voltage can be built up to its full value while the tuning means is traversing the signal. With a slow automatic volume control the actuating voltage would not build up to its full value until the originating signal had been passed, unless the tuning means were moved extremely slowly. The transformation from slow to fast AVC is effected by disconnecting the capacitor 220 from the AVC lead 36. This connection is effected by opening the circuit between the grounded armature and a contact 222 connected to the ground side of the capacitor 220 through a conductor 224.

The receiver is muted during the tuning operation by grounding the grid of one of the tubes in the audio section. This grounding is effected through conductor 226, contact 228, and the movable contact blade 217, armature 206 and ground connection 218 of the stop-on-signal relay. The movement of the relay into its operated position also results in conditioning the stop-on-signal means or spring charging solenoid for operation under the control of the positioned limit switch 200. In Fig. 1 the position limit switch is shown conditioning the stop-on-signal means for operation. It does this by completing the connection of the gas tube cathode 168 to ground. The cathode is connected through resistor 186 and conductor 190 to a relatively stationary contact 230 of the limit switch. The circuit to ground is completed through the movable limit switch blade 232, conductor 234, contact 236, and the relay armature carried contact 217, the relay armature 206, and ground connection 218.

The stop-on-signal relay also operates a brake, preferably consisting of a brake shoe constituted by an end 240 of the armature 206 and a brake drum 242 affixed to the high speed gear 86, as will be described shortly in greater detail. Thus when the relay is in its operated position, the brake is released to enable the spring 60 to move the tuning cores 52. When the signal is tuned in, the tube 112 is rendered conductive as heretofore described, and the bucking winding 176 is energized by a pulse of current preferably supplied as indicated by the discharge of the capacitor 174. The current flowing through the bucking coil overcomes the holding flux and the armature is magnetically unlatched so that a relatively strong spring 244 is capable of quickly moving the armature to open the magnetic circuit and to apply the brake, thereby quickly and effectively to stop the tuning means with a minimum of overrun which might otherwise be caused by the momentum of the moving parts. The brake, it should be noted, also acts upon a high speed member of the gear train, thereby requiring less brake pressure to hold the pull of the spring 60. Also, due to the gearing, a given overrun at the brake drum corresponds to an overrun at the tuner which is many times smaller, i. e., the overrun at the tuner is the overrun at the brake drum divided by the gear ratio.

When the relay is unlatched and returned to its non-operated position, the automatic gain control is returned to its normal slow mode of operation by the completion of a circuit connecting the capacitor 220 to ground through the relay armature. At the same time the mute is removed, the bleeder circuit to the relay operating winding 204 is broken, the stop-on-signal means is prevented from operating as is the spring recharging solenoid 62.

The spring recharging solenoid 62 is operated by energization of its winding 64. It can be operated only when the brake has been disengaged by the movement of the relay to its operated position and when the circuit to the limit switch is completed to ground through the relay armature. Furthermore, the limit switch has to be operated from the position in which it is shown in Fig. 1 to its other position, which operation occurs at the limit of movement of the tuning means at the high frequency end, i. e., when the cores 52 are retracted. At this limit a limit switch actuating member 250, made of nonconductive material and mounted near the end of arm 100 of lever 68, engages a switch yoke 252. The engagement is between a lug 254 at one end of the member 250 and the yoke. Member 250 is generally U-shaped and has a second lug 256 spaced from the first.

The switch yoke 252 is operatively connected to the center and movable contact 232 by a generally U-shaped resilient member 258 interposed between the blade and the yoke. When the lug 254 engages the yoke in its clockwise movement during the tuning operation the yoke is moved so that the yoke end of spring 258 is moved over center, whereupon the movable contact blade 232 is moved out of engagement with blade 230 and engages blade 260. The disengagement of blades 230 and 232 breaks the ground circuit for the tube 112 of the stop-on-signal means, thereby rendering the latter inoperative during the recharging. The engagement between contacts 232 and 260 completes an energizing circuit for the winding 64 of the spring recharging solenoid connecting it across the battery. The circuit extends from the battery through conductors 158 and 262 to one terminal of winding 64 and from there to ground through conductor 264, switch blades 260 and 232, conductor 234, contact 236, contact blade 217 of the armature, the armature 206, and conductor 218.

When the solenoid is energized, it pulls its plunger 66 downwardly as viewed in Fig. 1, thereby to recharge spring 60 and to move the cores 52 back to their low frequency position. This return movement is rapid because the wind vane does not appreciably restrain movement of the moving parts, it being disconnected as a result of the operation of the one-way drive provided by spring 90.

When the spring has been recharged and the tuning cores moved to their low frequency limit, the limit switch is operated again to deenergize the solenoid and to recondition the stop-on-signal means for operation. The limit switch is operated by the second lug 256 of the limit switch operating member 250, the switch at this time being in the position shown in Fig. 1.

It may be well briefly to review certain of the salient features and advantages of the invention as thus far described. The arrangement, it has been noted, includes power storage means for driving the tuning means in the tuning direction and resiliently applied means for stopping the tuning means. An arrangement of this character possesses several advantages. First, the stop-on-signal tuning is done while the tuner is being driven by the power storage means. Thus, no contact on the relay is required for breaking a motor circuit to stop the tuner. The application of the brake by the relay spring 244 is all that is required. With a motor, this relay spring action would also be required for declutching the motor to avoid over-travel. Another advantage of the relay spring stopping arrangement is that the tuner is held accurately in the tuned position by the relay brake spring. Thus, no electric power is consumed to hold the tuner in position while listening. Neither is any electrical energy required during listening by the solenoid which tensions the tuner drive spring. Both the tuner driving means and the stopping means are spring actuated and require power only during tuning. They consume no power whatever during listening.

A further result of this arrangement is that once a station is tuned, it will remain tuned, even if the power supply to the set is cut off and then later turned on again. If power from the B supply is required to hold the tuner stopped on a signal, any interruption of the power supply will detune the station being heard and when the power supply is again turned on, the tuner will continue in motion until the filaments have been heated and the power is again available to tune in and hold another station. Finally, with this double spring actuated arrangement, there is no motor or other electrical drive means which might create interference or produce surges in the power supply during tuning because, except for the electrical release of the magnetic latch, tuning is done solely by power stored in springs.

Before proceeding with a description of the operation of the apparatus, the mechanical construction thereof will be described briefly in connection with Figures 2 and 3. The apparatus is adapted to be mounted within the metal cabinet 270 of the receiver. A chasis 272 is secured within the cabinet by suitable means such as the screw fastenings 274.

The tuning means 14, 18 and 20 are mounted upon a stationary frame 276 supported a short distance beneath the chassis by means including the spacers 278. The movable yoke 54 supporting the cores 52 is slidably mounted upon a pair of spaced-apart guide rods 280 which are supported between the chassis and frame by the upturned end portions 282 and 284 of the frame 276. The yoke and core moving spring 60 has one end secured to a pin 286 mounted on the frame while the other end of the spring is secured to a downturned portion 54A of the yoke structure. The roller 72 is mounted upon the yoke structure for cooperative engagement with the arm 70 of the lever 68.

The charging solenoid 62 is mounted above the chassis 272, preferably by a flux conducting yoke 288, and in order that the lever 68, and particularly its arm 70, may be advantageously moved by the plunger 66, the arm 70 is provided with an offset intermediate portion 290 passing through an enlarged opening 292 in the chassis. The pivot pin 76 for the lever 68, it may be noted, is secured to the chassis 272.

Figures 4, 6:
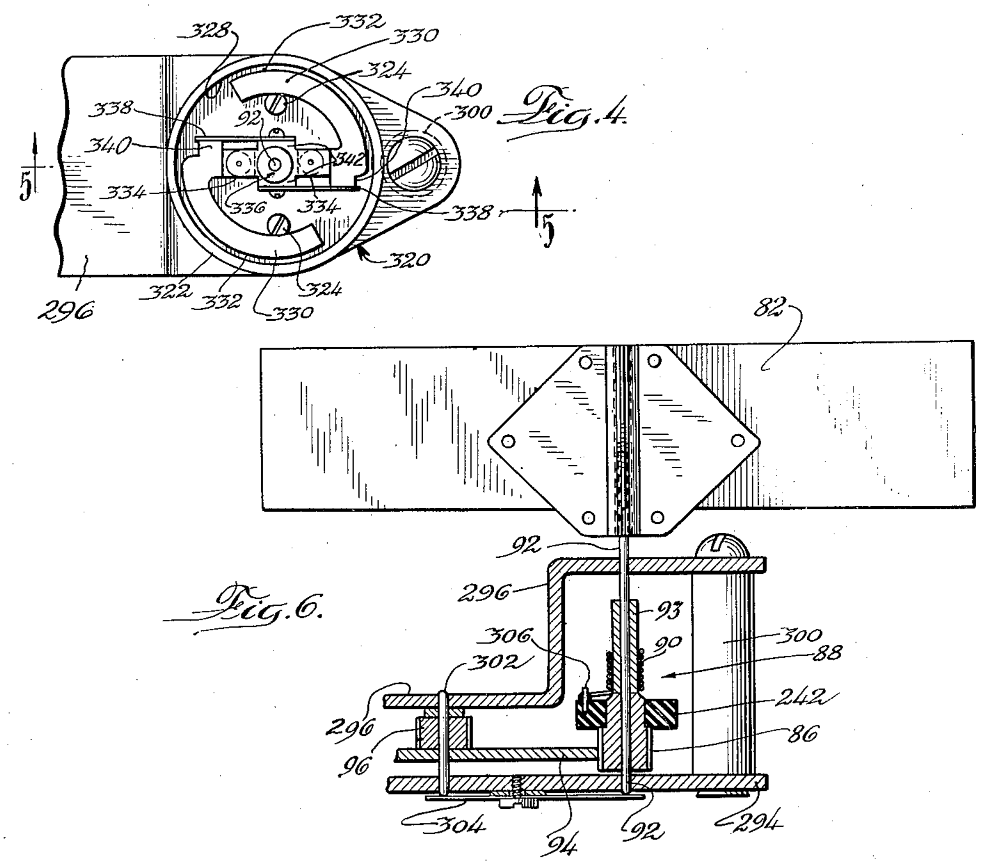
Fig. 4 is a fragmentary top plan view of a modified form of movement restraining means which may be used with the first embodiment of the invention.
Fig. 6 is a fragmentary enlarged vertical cross sectional view taken along the line 6—6 of Fig. 2, illustrating in detail a one-way driving connection to movement restraining means.

The sector gear 98 and gears 94, 96, and 86 are all mounted between a lower assembly plate 294 and an upper assembly plate 296 which are spaced above the chassis 272 by spacers 298, and from each other by spacers 300. The sector gear pivot pin 106 is secured to the lower assembly plate 294. The gears 94 and 96 are secured to a shaft 302 extending between the two assembly plates and biased upwardly by a thrust spring 304, which is best illustrated in Fig. 6.

The gear ratio of the transmission between the cores 52 and the periphery of the brake drum is about 26 to 1 and the broadcast band is traversed by the tuning means in about 4 seconds.

The high speed gear 86 is loosely mounted upon the wind vane shaft 92 and the latter rests upon the plate spring 304. The brake 242 is preferably made of Bakelite or other suitable material and is secured fixedly to the high speed gear 86 for rotation therewith. The one-way drive spring 90 is secured to the high speed gear and brake drum 242 by a pin 306, as best illustrated in Fig. 6.

The limit switch 200 is mounted above the lower assembly plate 294 in cooperative relation with the switch actuating member 250.

Figures 2, 3:
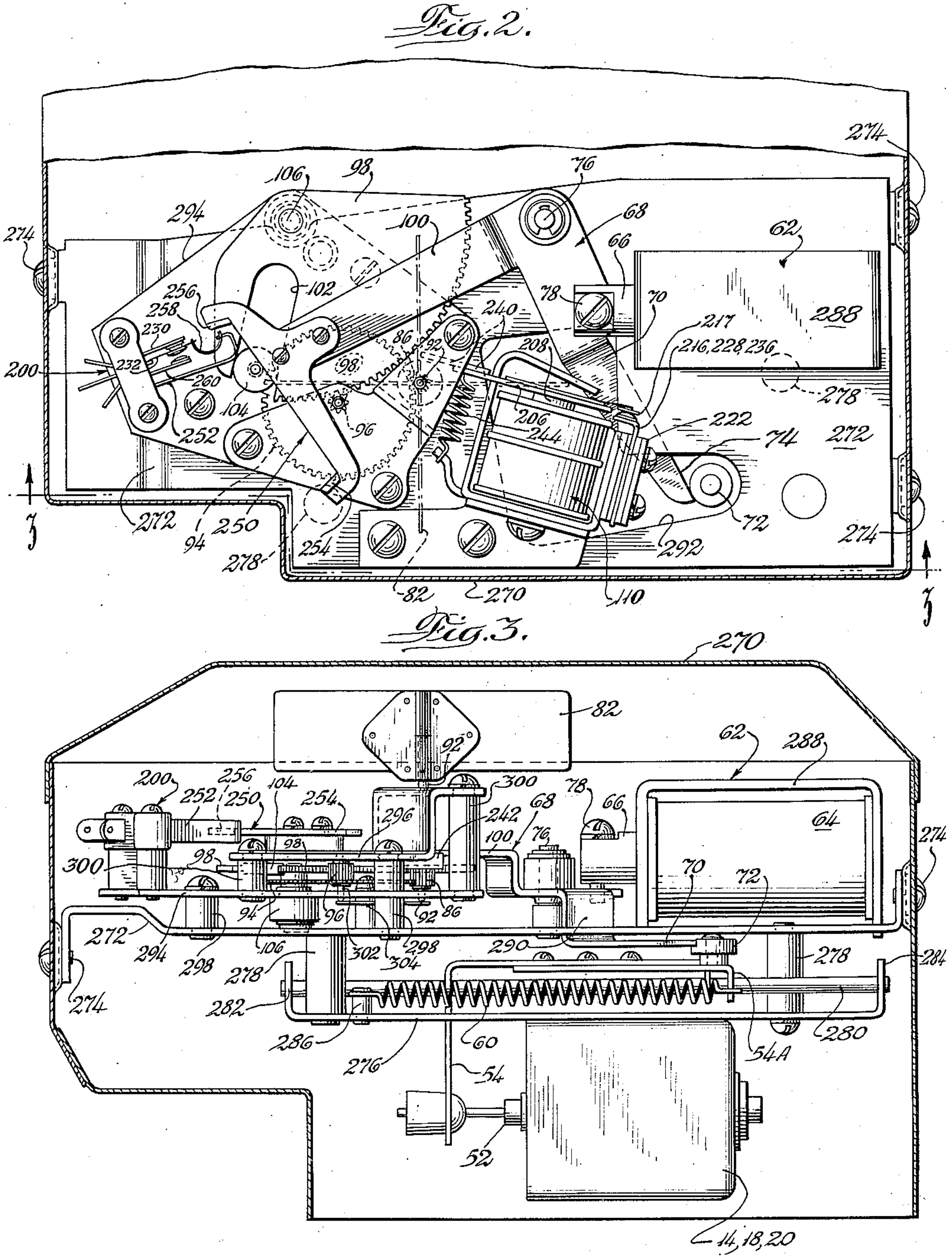
Fig. 2 is a detailed top plan view of certain of the apparatus shown in Fig. 1.
Fig. 3 is a detailed side elevational view of the apparatus shown in Fig. 2, the view being taken along the line 3—3.

The stop-on-signal relay 110 is mounted at the upper side of the chassis as viewed in Fig. 2, it having been omitted from Fig. 3 better to illustrate the remaining structure. However, as apparent from Fig. 2, the brake drum engaging portion 240 of the armature is arranged in cooperative relation with the brake drum 242 so that when the relay is in its nonoperated position the spring 244 pulls the brake element against the drum, thereby securely to hold the tuning means in stopped position.

In the description of the operation it will be assumed first that the limit switch is in the position in which it is shown in Fig. 1, whereat the spring charging solenoid 62 is deenergized. It will be assumed also that the stop-on-signal relay 110 is in its nonoperated position so that the tuning means is positively stopped by the brake 240, 242, and that the receiver is operating with the normal slow AVC.

In order to select another station it is necessary only to depress the push button switch 202 thereby connecting the relay operating winding 204 across the battery through conductors 212 and 158. The relay armature 206 is attracted to close the magnetic circuit of the relay. It is magnetically latched in this position by the residual flux and also by the additional flux created by the small current flowing through the coil 204 and through the bleeder resistor 214. The receiver is muted through the circuit including conductor 226, and the limit switch is connected to ground through conductor 234, thereby placing it in condition selectively to render operative either the stop-on-signal means or the spring charging solenoid. In the illustrated position of the apparatus, the limit switch places the stop-on-signal means into operation because it connects to ground the cathode of the tube 112 through a circuit including resister 186, conductor 190, limit switch contact blades 230, 232, conductor 234, the armature 206 and ground conductor 218.

When the stop-on-signal relay is operated the brake is released by disengagement of brake member 240 from the brake drum 242. Thus the spring 60 is conditioned to and does move the yoke 54 and the cores 52, mounted thereon in tuning direction, upwardly from the low frequency position toward the high frequency position. Also, the AVC is made fast by disconnecting capacitor 220 from ground.

The tuning cores are moved by the spring at a speed determined by the action of the wind vane 82 which encounters sufficient air resistance as the tuning speed increases to keep the tuning speed within the range of best operation of the stop-on-signal means. It should be noted that the wind vane does not offer any appreciable resistance as the tuning means starts from rest, but does offer a large and controlling resistance when the system has come up to speed. In this way the maximum speed can be limited without imposing resistance to starting. This is important so that reliable operation can be obtained without too strong a spring. If the spring is not too strong, less current is required by the solenoid to charge the spring. It is thus highly advantageous to provide a speed control means having the greatest speed limiting effect with the least static friction and in which the power required to drive it rises rapidly with increase above normal speed.

The stop-on-signal means is prevented from stopping the apparatus at the same station or signal at which it was previously stopped by the time delay in charging the capacitor 174, which time delay is provided by the capacitor and the current limiting resistor 178 through which the capacitor is charged from the "B" supply 42.

The length of the time delay is determined by the capacitance of the capacitor and the resistance of the resistor, the time delay increasing with an increase in the values of capacitance and resistance. In this connection, the sharpness of the stop-on-signal or balanced bridge selective circuit should be considered. If the stop-on-carrier signal response is sharp, then less time delay is required to insure that there will be no second stoppage on the same signal.

When the signal is tuned in, a positive control voltage is applied to the grid 162 of the gas tube 112 in a manner hereinbefore described in detail with the result that the tube is rendered conductive and the capacitor 174 discharges through it and the bucking coil 176 of the relay. The current surge through the relay produces a flux opposing the latching flux with the result that the relay armature is released and opened by the spring 244 which simultaneously applies the brake upon the high speed gear 242 and returns the various circuits to their initial conditions for normal audio reception. The one-way drive 88 interposed between the high speed gear and brake drum and the wind vane enables the apparatus to be stopped quickly even if the wind vane has substantial momentum as the vane may come to rest slowly after the tuner has been stopped by the brake.

In the event the tuning means reaches the limit of its movement in the frequency increasing direction without tuning in a signal, or, in the event that the push button 202 is kept depressed to keep the relay in operated position, then the limit switch will be actuated to render inoperative the stop-on-signal means and to energize the spring charging solenoid 62 through the previously described circuit. When this occurs, the solenoid plunger 66 moves the lever 68 and the various gears in a reverse direction, thus charging the spring and returning the tuning cores to their initial low frequency position. This movement is fast because it is not restrained by the wind vane which is effectively disconnected when the apparatus moves in this direction as a result of the one-way driving connection 88 to the wind vane.

Figure 5:
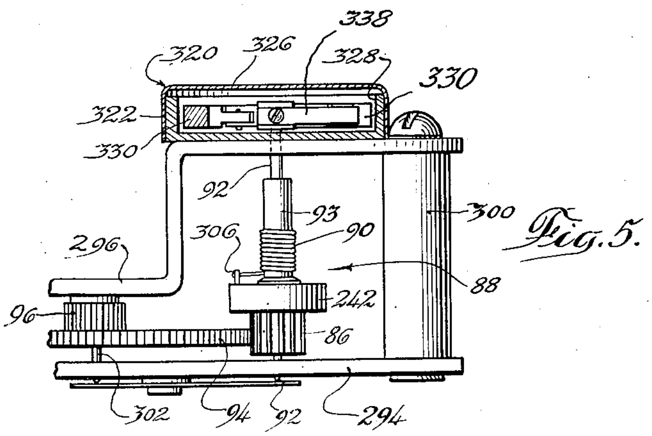
Fig. 5 is a vertical cross sectional view taken along the line 5—5 of Fig. 4.

A centrifugal friction type movement restraining means may be used in place of the wind vane, and this type of restraining means is illustrated in Figs. 4 and 5. An important advantage of this type is its compactness which enables it to be used where space is limited and where the larger wind vane might not find adequate space or would complicate design problems. The centrifugal restraining means is indicated as a whole by reference character 320. It is mounted in substantially the same position as the wind vane 82, i. e., at the upper end of the shaft 92 and above the upper assembly plate 296 and is driven in the same manner as the wind vane through a one-way driving connection.

The speed restraining means includes a small flat circular case 322 mounted on the top of the plate 96 by a pair of set screws 324. The mechanism may be protected from dust by means of a dust cover 326 (shown only in Fig. 5) which fits over the open top of the case. The inner surface 328 of the case is accurately and smoothly machined to provide a uniform friction surface for engagement by a plurality (preferably two) of friction shoes 330. The outer surfaces 332 of the friction shoes should be fitted to the curvature of the surface 328 to insure smooth uniform braking engagement.

The friction shoes 330 are pivotally mounted to associated opposed lugs 334 extending in opposite directions from the central spinner 336 fixedly secured to the upper end of shaft 92 for rotation therewith.

The friction shoes are rotated at relatively high speed through the transmission means so that they tend to fly outward and engage the inner friction surface of the case under the action of centrifugal force. They thus effectively limit the speed of the tuning means when the latter are moved by the spring 60.

To avoid any static friction which might interfere with reliable starting of the tuning mechanism under the pull of the spring when the brake is released by the relay, the friction shoes are maintained disengaged from the friction surface 328 until the tuning means has almost reached its normal speed. This is done by a pair of springs 338 which bias and hold the shoes out of engagement with the friction surface until the tuning means comes up to speed. The springs bear against heels 340 at the inner ends of the friction shoes and they are attached to opposed projections 342 of the spinner 336. The tuning speed may be varied as desired by adjusting the resilience of the springs 38, thereby to control the point at which the centrifugal force will overcome the resilience of the springs.

It is believed that the operation of the apparatus utilizing the centrifugal friction type movement restraining means need not be described as the operation of the apparatus is substantially the same as described above. It may, with proper design, permit slightly more rapid tuning because there is no restraining effect until the moving parts come up to speed.

It should be understood that the present invention is susceptible of modification by those skilled in the art and that the embodiments of the invention described in detail above are intended to be illustrative and not limitative of the invention except in so far as set forth in the accompanying claims.

Having thus described my invention, what I claim as new and desire to secure by Letters Patent is:

1. Stop-on-signal radio apparatus having variable tuning means, means including resilient mechanical power storage means operatively connected to said tuning means for varying said tuning means in one direction to tune said apparatus to signals, means including signal responsive relay means and resiliently applied braking means controlled by said relay means and controlling said tuning means for terminating variation of said tuning means by said power storage means when the latter varies in said one direction, and means for varying said tuning means in an opposite direction and for simultaneously storing power in said power storage means.

2. Stop-on-signal radio apparatus having variable tuning means for tuning in different signals, mechanical potential energy storage means for varying said tuning means, means restraining variation of said tuning means by said mechanical potential energy storage means for regulating the speed of movement of the tuning means to a speed suitable for stop-on-signal tuning, means for terminating the variation of said tuning means in response to a signal tuned in by the tuning means, and means for charging the power storage means.

3. Stop-on-signal radio apparatus having variable tuning means for tuning in different signals, mechanical potential energy storage means for varying said tuning means, means including centrifugal braking means restraining variation of said tuning means by said mechanical potential energy storage means for regulating the movement to a speed suitable for stop-on-signal tuning, and means for terminating the variation of said tuning means in response to a signal.

4. Stop-on-signal radio apparatus having variable tuning means for tuning in different signals, resilient power storage means for varying said tuning means, means including centrifugal braking means restraining variation of said tuning means by said power storage means for regulating the movement to a speed suitable for stop-on-signal tuning, means for terminating the variation of said tuning means in response to a signal, and means for preventing application of said centrifugal braking means when starting said tuning means.

5. Stop-on-signal radio apparatus having movable tuning means, mechanical power storage means, motion multiplying means having a low speed end connected to said tuning means and driven by said power storage means and having a high speed end, speed regulating means and unidirectional drive means between said high speed end and the speed regulating means, and braking means acting upon said high speed end on the driving side of said unidirectional drive means for stopping said tuning means in response to a signal tuned in by the tuning means while driven by said power storage means.

6. Stop-on-signal radio apparatus having tuning means variable in a predetermined direction for tuning in different signals, resilient power storage means for varying said tuning means in said predetermined direction, means for terminating the variation of said tuning means in said predetermined direction in response to a signal tuned in by the tuning means, and means automatically operated upon completion of the movement of the tuning means in said one direction to recharge said resilient power storage means.

7. Stop-on-signal radio apparatus having tuning means variable from an initial position in a predetermined direction for tuning in different signals, resilient power storage means for varying said tuning means in said predetermined direction, means for terminating the variation of said tuning means in said predetermined direction in response to a signal tuned in by the tuning means, and means automatically operated upon completion of the movement of the tuning means in said predetermined direction to recharge said resilient power storage means and for varying said tuning means in the opposite direction to its initial position.

8. Stop-on-signal radio apparatus having tuning means variable in a predetermined direction for tuning in different signals, mechanical power storage means operable upon discharging to vary said tuning means in said predetermined direction, means for terminating the variation of said tuning means in said predetermined direction in response to a signal tuned in by the tuning means, and motion transmitting means connected to said power storage means and to the tuning means to move the latter in the direction opposite to said predetermined direction and for recharging said mechanical power storage means.

9. Stop-on-signal radio apparatus having movable tuning means, a spring for moving said tuning means, speed regulating means restraining movement of said tuning means by said spring, means for terminating the movement of said tuning means by said spring in response to a signal tuned in by the tuning means, means including recharging means connected to said spring for recharging said spring and moving said tuning means in an opposite direction, and unidirectional drive means between said speed regulating means and recharging means.

10. Stop-on-signal radio apparatus having tuning means variable in a predetermined direction for tuning in different signals, resilient power storage means for varying said tuning means in said predetermined direction, means for terminating the variation of said tuning means in said predetermined direction in response to a signal tuned in by the tuning means, means for recharging said resilient power storage means and for varying said tuning means in the opposite direction, and means restraining variation of said tuning means by said power storage means for regulating the movement in said predetermined direction to a speed suitable for stop-on-signal tuning, said means exercising less restraint in said opposite direction whereby the charging of said power storage means may be effected more rapidly.

11. Stop-on-signal radio apparatus having tuning means variable in a predetermined direction for tuning in different signals, resilient power storage means for varying said tuning means in said predetermined direction, electromagnetic means operatively connected to said power storage means and energizable to store power in said storage means, means including limit switch means operable by said power storage means for energizing said electromagnetic means, thereby to store power in said storage means, and means for terminating the variation of said tuning means by said power storage means in said predetermined direction in response to a signal tuned in by the tuning means, and switch means to render said terminating means inoperative while said electromagnetic means is energized.

12. Stop-on-signal radio apparatus, including in combination, power storage means of a type which can maintain a mechanical potential energy charge over a long period of time and is not appreciably affected by changes in position or by momentum effects, motion multiplying means having a low speed end driven from said power storage means and a high speed end, speed regulating means driven at high speed from said high speed end, movable tuning means for tuning in different signals, a driving connection between said tuning means and the low speed end of said motion multiplying means, means including braking means acting upon said high speed end for terminating movement of said tuning means by said power storage means in response to a signal tuned in by the tuning means, and motion transmitting means operatively connected to said low speed end for recharging said power storage means and moving said tuning means in the reverse direction.

13. In a stop-on-signal radio receiver, variable tuning means, spring means for varying the tuning means in one direction, means for returning said tuning means in the other direction and storing power in said spring, means for regulating the speed of said tuning means for accurate stop-on-signal tuning when moved in said one direction by the power stored in said spring, brake means for stopping said tuning means, spring means for normally applying said brake means, relay means to release said brake means and tension said last mentioned spring means, and electron tube means responsive to a signal from said receiver to operate said relay means to cause said last mentioned spring means to apply the brake and stop the variation of said tuning means in said one direction.

14. Stop-on-signal radio apparatus having an electrical power source, movable tuning means for tuning in different signals, a first resilient power storage means for driving said tuning means, a second resilient power storage means for stopping said tuning means, means including electromagnetic means energizable from said power source for storing energy in said first power storage means, means including other electromagnetic means energizable from said power source for storing power in said second power storage means and releasing said tuning means for movement by said first power storage means, and means operable in response to the tuning in of a signal for releasing said second power storage means, whereby the movement of said tuning means by said first power storage means is stopped at said signal.

15. Stop-on-signal radio apparatus having an electrical power source, movable tuning means for tuning in different signals, a first resilient power storage means for driving said tuning means, a second resilient power storage means for stopping said tuning means, means including electromagnetic means directly energizable from said power source for storing energy in said first power storage means, means including other electromagnetic means directly energizable from said power source for storing power in said second power storage means and releasing said tuning means for movement by said first power storage means, and means operable in response to the tuning in of a signal for releasing said second power storage means, whereby the movement of said tuning means by said driving power storage means is stopped at said signal.

16. Stop-on-signal radio apparatus having movable tuning means for tuning in different signals, a first spring for driving said tuning means, a second spring for stopping said tuning means, means including energy supplying means for storing energy in said first spring, means including other energy supplying means for storing power in said second spring and releasing said tuning means for movement by said first spring, and means operable in response to the tuning in of a signal by said tuning means for releasing said second spring, whereby the movement of said tuning means by said first spring is stopped at said signal.

17. Stop-on-signal radio apparatus having a low voltage direct current power source, movable tuning means for tuning in different signals, a first resilient power storage means for driving said tuning means, a second resilient power storage means for stopping said tuning means, means including electromagnetic means energizable from said power source for storing energy in said first power storage means, means including other electromagnetic means energizable from said power source for storing power in said second power storage means and releasing said tuning means for movement by said first power storage means, and means operable in response to the tuning in of a signal for releasing said second power storage means, whereby the movement of said tuning means by said first power storage means is stopped at said signal.

18. Stop-on-signal radio apparatus having an electrical power source, movable tuning means for tuning in different signals, a first resilient power storage means for driving said tuning means, a second resilient power storage means for stopping said tuning means, means including electromagnetic means energizable from said power source for storing energy in said first power storage means, means including other electromagnetic means energizable from said power source for storing power in said second power storage means and releasing said tuning means for movement by said first power storage means, and means including electronic means energized from said power source controlling said second power storage means and operable in response to the tuning in of a signal for releasing said second power storage means, whereby the movement of said tuning means by said first power storage means is stopped at said signal.

19. Stop-on-signal radio apparatus having variable tuning means for tuning in different signals, resilient power storage means operatively connected to the tuning means for varying the same, speed regulating means for controlling the speed of operation of the tuning means, the speed regulating means being of a type offering little restraint at rest and offering relatively large restraint when operating at a speed corresponding to that at which the tuning means is being varied at a normal tuning rate, and stopping means for terminating the variation of the tuning means by the power storage means in response to a signal tuned in by the tuning means.

20. Stop-on-signal radio apparatus having variable tuning means for tuning in different signals, resilient power storage means operatively connected to the tuning means for varying the same, speed regulating means for controlling the speed of operation of the tuning means, the speed regulating means being of a type offering little restraint at rest and offering relatively large restraint when operating at a speed corresponding to that at which the tuning means is being varied at a normal tuning rate, stopping means for terminating the variation of the tuning means by the power storage means in response to a signal tuned in by the tuning means, manually operated means for releasing the stopping means thereby to condition the apparatus for restarting of the variation of the tuning means by the power storage means.

21. Stop-on-signal radio apparatus having tuning means provided with a movable element, a pivotally mounted member movable through an angle of less than 360° in opposite directions and operably connected to said movable element at a point far removed from the pivot of the member, a maintained contact switch having an operating member movable to two different positions, spaced apart means upon said pivotally mounted member for engaging and moving said operating member at opposite limits of movement of said pivotally mounted member, and power supplying means controlled by said switch and acting on said pivoted member at a point near the pivot thereof.

22. Stop-on-signal radio apparatus having variable tuning means, mechanical potential energy storage means for supplying energy for varying the tuning means, electromagnetic means for charging the energy storage means, stop-on-signal means for terminating the variation of said tuning means by the energy storage means in response to the tuning-in of a signal by the tuning means, and switch means operated by the energy storage means for rendering the stop-on-signal means inoperative while said energy storage means is being charged.

23. Stop-on-signal radio apparatus having variable tuning means, mechanical potential energy storage means for varying said tuning means, means for charging said energy storage means, stop-on-signal means for terminating variation of said tuning means by said energy storage means in response to the tuning-in of signals by the tuning means, and switch means operated by the charging means for rendering the charging means inoperative while the tuning means is in operation.

24. Stop-on-signal radio apparatus having variable tuning means, mechanical potential energy storage means for varying said tuning means, electromagnetic means for charging said energy storage means, stop-on-signal means for terminating variation of said tuning means by said power storage means in response to the tuning-in of a signal by the tuning means, and a two-position switch means operated by the power storage means to one position to render the stop-on-signal means inoperative and to render the electromagnetic means operative, said switch means being operated by the electromagnetic means to its other position to render the electromagnetic means inoperative and to render the stop-on-signal means operative.

25. Stop-on-signal radio apparatus having tuning means variable across a frequency spectrum for tuning in different signals, mechanical potential energy storage means operatively connected to the tuning means for varying the same, the energy storing means, when charged, exerting a force substantially greater than the frictional forces opposing movement of said tuning means and tending to vary the tuning means at excessive speed, speed restraining means of the type exerting little restraint at starting and a large restraint equal to the force of the power storage means less the sum of the frictional forces at a normal tuning speed, means for terminating variation of the tuning means by the power storage means in response to a signal tuned in by the tuning means, means for charging the energy storage means after the tuning means has scanned the frequency spectrum, the charging means being capable of exerting a force greater than the combined forces of the power storage means and the sum of all of the frictional forces operating to resist charging of the energy storage means.

26. Stop-on-signal radio apparatus having variable tuning means for tuning in different signals; mechanical potential energy storage means for varying said tuning means in one direction; means restraining variation of said tuning means by said mechanical potential energy storage means for regulating the speed of movement of the tuning means in said direction to a speed suitable for stop-on-signal tuning, said restraining means including a member having a large fluid drag at said tuning speed, a speed step-up transmission mechanism connected between the energy storage means and the drag member, said mechanism having a total friction force small compared to said fluid friction drag; means for terminating the variation of said tuning means in said one direction in response to a signal tuned in by the tuning means; and means for moving the tuning means in the opposite direction for charging the energy storage means.

EDWARD F. ANDREWS.

REFERENCES CITED

The following references are of record in the file of this patent:

UNITED STATES PATENTS

| Number | Name | Date |
|---|---|---|
| 1,968,302 | Maurer | July 31, 1934 |
| 2,056,200 | Lowell | Oct. 6, 1936 |
| 2,205,097 | Knos et al. | June 18, 1940 |
| 2,299,082 | Elliott | Oct. 20, 1942 |
| 2,304,871 | Andrews | Dec. 15, 1942 |